United States Patent [19]
Oblak et al.

[11] Patent Number: 5,319,972
[45] Date of Patent: Jun. 14, 1994

[54] ULTRASONIC LIQUID LEVEL MEASUREMENT SYSTEM

[75] Inventors: Tod A. Oblak, Belle Vernon; Daniel F. Dudek, Forest Hills; John R. Smith, Monroeville, all of Pa.

[73] Assignee: Westinghouse Electric Corp., Pittsburgh, Pa.

[21] Appl. No.: 963,892

[22] Filed: Oct. 19, 1992

[51] Int. Cl.⁵ ............................................. G01F 23/00
[52] U.S. Cl. ................................... 73/290 R; 376/252
[58] Field of Search ................ 376/252, 246, 245; 73/290 R; 340/621; 976/DIG. 222

[56] References Cited

U.S. PATENT DOCUMENTS

| | | | |
|---|---|---|---|
| 4,170,765 | 10/1979 | Austin et al. | 367/100 |
| 4,221,004 | 9/1980 | Combs et al. | 367/114 |
| 4,315,325 | 2/1982 | Blades | 367/98 |
| 4,785,664 | 11/1988 | Reebs | 73/290 V |
| 4,890,490 | 2/1990 | Telford | 73/290 |
| 4,933,915 | 6/1990 | Bostrom | 367/99 |
| 5,131,271 | 7/1992 | Haynes et al. | 73/290 |

*Primary Examiner*—Donald P. Walsh
*Assistant Examiner*—Meena Chelliah
*Attorney, Agent, or Firm*—J. C. Valentine

[57] ABSTRACT

An ultrasonic level measuring system includes a transducer mounted on the bottom of a pipe which launches acoustic pulses up through the pipe wall into the water. The pulses are reflected from the water surface and received by the transducer along with pulses reflected by the pipe wall and reverberations within the pipe wall. The system has a monitor mode in which a variable threshold for the reflected pulses is set by dividing the time after a trigger pulse into time bins and automatically establishing a threshold level for each time bin. In a signal search mode, the time bin containing the liquid level is identified from a histogram recording reflected pulses which exceed the threshold levels for the various time bins. In a normal operating mode, foreground calculations precisely calculating the liquid level in the identified bin alternate with background calculations which reassess the identification of the time bin containing the liquid level. If the bin identified by the background calculation does not agree with the time bin being used by the foreground calculation, the system restarts by returning to the signal search mode. Various system parameters can be easily changed without the need to rewrite code.

14 Claims, 8 Drawing Sheets

ULTRASONIC LIQUID LEVEL MEASUREMENT SYSTEM

BACKGROUND OF THE INVENTION

1. Field of the Invention

This invention relates to an ultrasonic system for measuring the level of a liquid in a container, such as for instance, the level of reactor coolant in the pipes of a nuclear reactor.

2. Background Information

There are many applications where it is desirable to measure the level of liquid in a container, such as a pipe, without penetrating the liquid barrier. One such application is a nuclear power plant where there is a need to accurately know the water level in the main coolant pipes during maintenance operations when water is being circulated for residual heat removal (RHR). The normal water level under these conditions is above the center of the horizontal pipes, but below the full-pipe level. If the level drops too low, vortexing can occur causing air entrainment with the potential for air binding of the pump. High water levels during maintenance activities on steam generators or reactor pump seals, on the other hand, have resulted in reactor coolant spills and personnel contamination.

A commonly used method of measuring water level in the coolant pipes is to observe the level on a flexible plastic tube connected to the coolant pipe. This requires penetration of the pipe which has the potential for leaks and loss-of-residual-heat-removal events.

Assignee of the subject invention has developed a non-intrusive ultrasonic level measurement system which does not require penetration of the pipe. While other ultrasonic liquid level measurement systems exist, there are particular problems in their application to nuclear power plants. First, it is desired that the transducers remain in place during plant operation in order to eliminate the cost AND personnel radiation exposure of repeated installations. However, this exposes the transducers to temperatures up to 650° F. and high radiation levels for long periods of time. Another difficulty in this application is that most plants have centrifugally cast stainless steel pipe, which strongly attenuates ultrasonic waves. Also typical pipe dimensions are 29 inch to 50 inch inside diameter and about 2½ inches in wall thickness.

In the existing ultrasonic level measurement system, a transducer placed on the bottom of the horizontal pipe launches an acoustic wave which passes upward through the pipe into the water where it is reflected by the water surface and returns back through the wall to the transducer. The total travel time of the pulse reflected by the water surface is used to calculate water level. An echo is also produced at the pipe's inner surface because of the acoustic impedance mismatch between stainless steel and water. This echo reverberates within the pipe wall with the reverberation decaying with time. A threshold is established to distinguish the surface reflection signal from the reverberations. This threshold must be set low enough to detect high water level signals which are attenuated by their longer travel through the water, resulting in the reverberation signals being greater than the threshold for low level signals. The threshold is set by assuming a high threshold and then successively lowering the threshold until a selected number of reflected pulses out of a given number of trigger pulses exceed the threshold. If a prescribed number of these reflected pulses are within a predetermined time range, the last value of the threshold is reduced by a given percent with the result used as the threshold for determining water level. This system could not monitor the required lower water levels because of reverberation.

There is a need for an improved ultrasonic level measuring system which is more reliable and can accurately measure low liquid levels.

SUMMARY OF THE INVENTION

In accordance with the invention, an ultrasonic level measurement system establishes a variable threshold for detecting pulses reflected from the surface of the liquid in a container such as a pipe. This variable threshold essentially tracks the reverberation profile, and preferably establishes individual threshold levels for time bins calculated from the trigger pulse generated when the transducer launches the acoustic wave through the pipe wall into the contained liquid. This variable threshold can be manually set, but is preferably automatically set by iteratively raising or lowering the threshold to achieve a selected low percentage of reverberations which exceed the threshold and then increasing the threshold by a percentage and a fixed offset above that level.

The system also includes an improved signal search mode in which a histogram is generated from rounds of data to record the number of pulses during each time bin which exceed the threshold level for that bin. The lowest bin number for which the recorded number of reflection pulses exceeds a programmable percentage of trigger pulses is selected as the initial bin in which the present water level is located.

The system is then switched to a normal operating mode which repetitively, alternately performs a foreground calculation which calculates the precise water level from reflected pulses received in the initial bin identified in the signal search mode, and a background calculation which in a manner similar to that of the signal search mode, generates a histogram of reflected pulses exceeding the variable thresholds for each of the bins. This background calculation is used to verify that the foreground calculation is being performed on the proper signal in the proper bin. If the bin identified by the background calculation does not agree with the result of the foreground calculation, and this occurs a programmable number of times, the system transfers back to the signal search mode to reestablish the location of the water level. The system also reverts to the signal search mode if a programmable percentage of pulses are not detected in the foreground calculation.

In accordance with the invention, the various parameters, such as for instance the percentage of reflected pulses that must be seen for a valid calculation of liquid level, can be easily programmed by the operator without the need for modifying code. This provides a great deal of flexibility for fine tuning the system, and for adapting the system for different applications.

More particularly, the invention comprises a system for measuring a liquid level in a liquid carrying container including a transducer acoustically coupled to the container wall, pulse generating means applying a pulse to the transducer to launch an acoustic pulse through the container wall into the liquid which generates reflected pulses from the container wall and liquid surface and reverberations which decay with time following the trigger pulse to produce a reverberation profile, threshold setting means, setting a variable threshold which is reduced in magnitude with time following the trigger pulse and which exceeds the reverberation profile in magnitude, and means comparing reflective pulses with the variable threshold at the time the reflected pulses are received, and generating a liquid level signal when the magnitude of reflected pulses exceeds the variable threshold.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention will be described as applied to determining the water level in the pipes of a pressurized water reactor; however, it will be appreciated by those skilled in the art that the invention has application to determining liquid levels in other containers.

Figure 1:
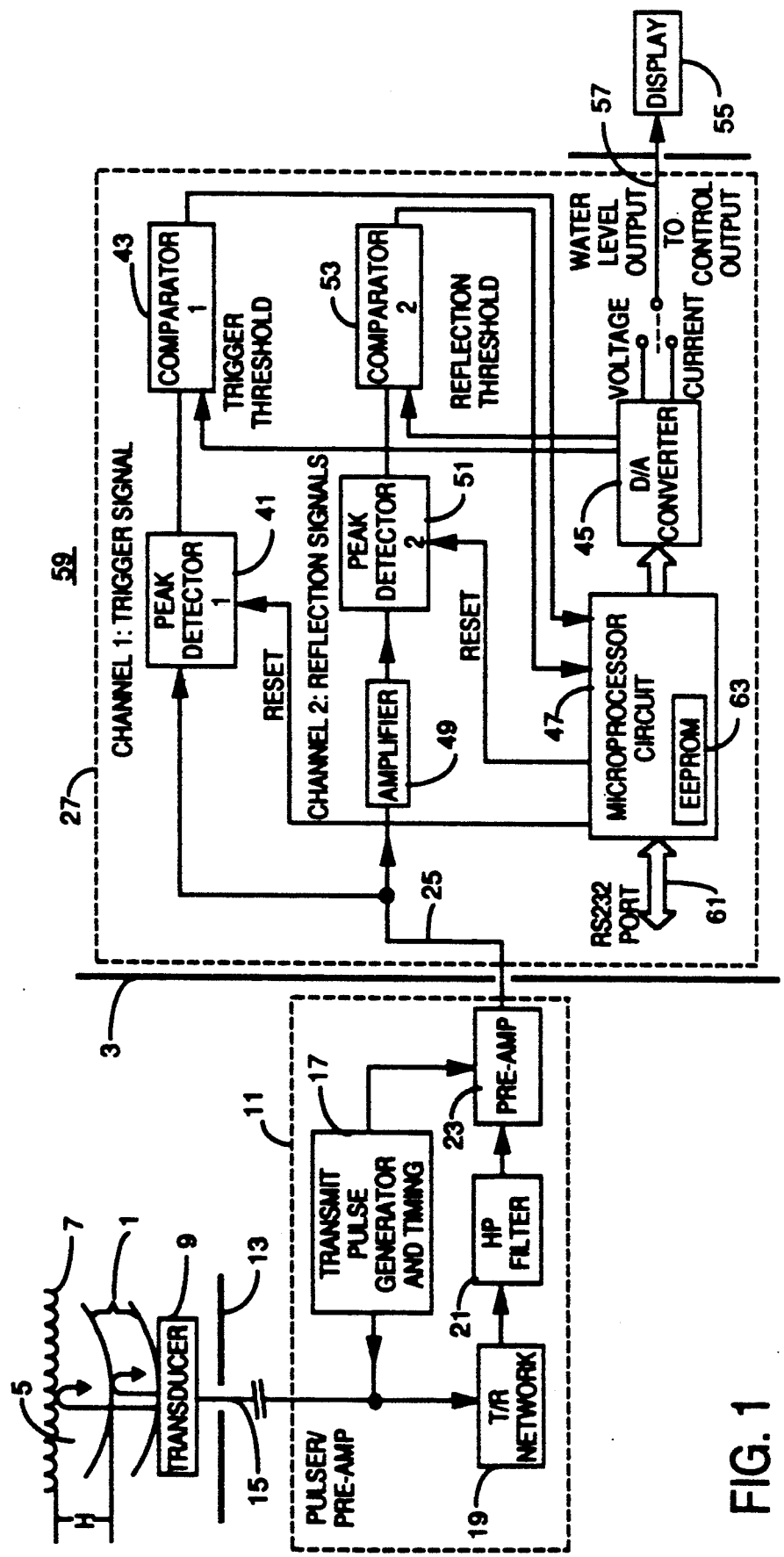
FIG. 1 is a schematic diagram of an ultrasonic level measurement system in accordance with the invention.

FIG. 1 illustrates the lower section of a hot leg pipe 1 of a nuclear reactor which is located inside of containment 3. Water 5 contained in the pipe 1 has an upper surface 7 to which the height, H, of the water is measured. A transducer 9 is acoustically coupled to the bottom of the horizontal pipe 1. A pulser/preamplifier 11 located inside containment 3, but separated from the pipe 1 by a shield wall 13 is connected to the transducer 9 by cabling 15. A transmit pulse generator and timing circuit 17 in the pulser/preamp 11 repetitively generates with a period T a voltage transient which shock-excites the transducer 9. The transducer 9 in turn launches a transient ultrasonic wavefront through the wall of the pipe 1 and into the water 5. Echoes, in the form of short wave packets return to the transducer 9 and produce electrical signals in the form of short bursts at the transducer resonant frequency.

The pulser/preamp 11 also includes a transmit/receive (T/R) network 19 and a high pass (HP) filter 21 which, respectively, protect the receiver circuits from the transmit pulse and eliminate low frequency energy caused by vibration and other sources. A preamp 23 provides linear gain with low noise, while blanking the transducer output for nominally 20 $\mu$Sec and injecting a trigger signal into a triaxial cable 25 connecting the pulser/preamp 11 with a signal processing unit 27 outside of containment 3. The trigger pulse is sent to the signal processing unit 27 to synchronize its operations.

Some of the acoustic signal generated by the transducer 9 reflects off the inner wall of the pipe 1 and is detected by the transducer 9, and significant acoustic signals reverberate in the pipe 1 and may be observed by the transducer 9 for a relatively long period time. However, a sufficient portion of the signal propagates through the pipe 1 and is coupled into the water 5. This desired signal propagates through the water 5, reflects off the surface 7 of the water, travels back toward the transducer 9, is coupled into the pipe 1, propagates through the pipe, and is finally presented to the transducer.

Immediately after the transmit pulse is generated, the T/R network 19 switches to the receive mode and the reflected signal detected by the transducer 9 is filtered in the HP filter 21, amplified in the preamp 23 and sent to the signal processing unit 27 over the cable 25. The function of the signal processing unit 27 is to determine which signal received is the true indication of the signal reflected off the surface of the water, measure the time between the trigger signal and the water reflection signal, and produce an analog signal proportional to the detected water level.

Figure 2:
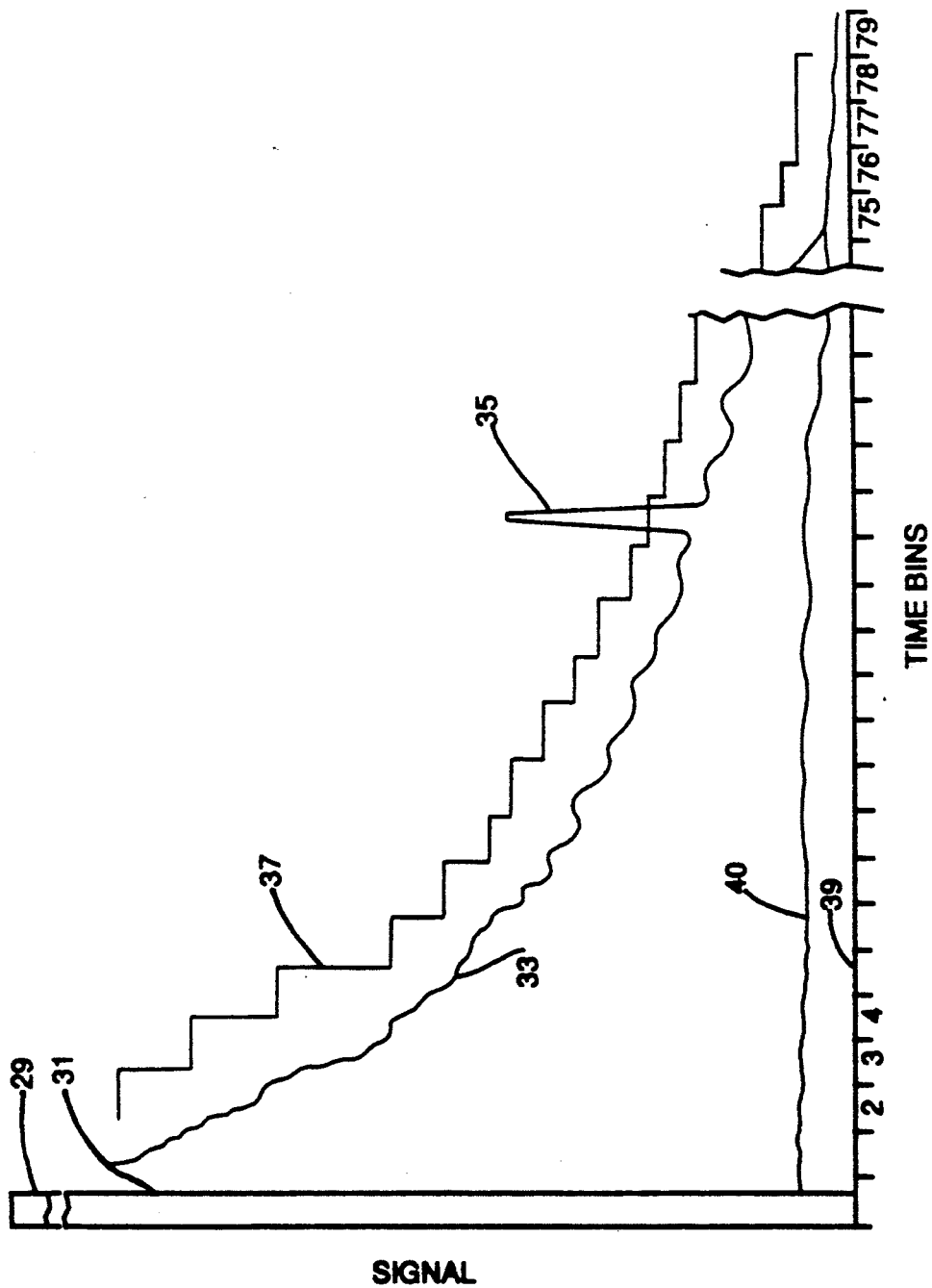
FIG. 2 is a diagram illustrating the setting of the variable reflection threshold in accordance with the invention.

FIG. 2 is a diagram showing a response of the transducer 9. The trigger pulse 29 is a very large signal. The reflection from the interior wall of the pipe is shown at 31 and the reverberation profile which decays with time is shown by the trace 33 with the reflection from the water surface indicated by the spike 35. The variable threshold 37 is set above the reverberation profile 33, but below the level of the water surface reflection 35. The variable threshold 37 is set, as discussed in more detail below, by dividing the time following the trigger pulse into time bins 39. In the exemplary system, these time bins are each 50 $\mu$s in duration and 79 such time bins are provided to accommodate pipes with an ID up to 50 inches and a wall thickness of about 2½ inches, filled with water at high temperature. The first bin representing the water level inside the pipe is the second bin which begins at 50 $\mu$s and extends to 100 $\mu$s. The threshold 37 remains above the noise 40 for all bins.

Returning to FIG. 1, the signal from the pulser/preamp 11 is sent directly over channel 1 to a first peak detector 41 which detects and shapes the envelope of the pulse received and applies it to a first comparator 43. The threshold for the comparator 43, identified as the trigger threshold, is generated by a quad digital to analog (D/A) converter 45 under control of a microprocessor circuit 47. This trigger threshold is set so that the trigger signal is reliably detected, but the signals detected by the transducer 9 are not seen at the output of the comparator 43.

A separate channel 2 includes an amplifier 49 which detects signals received by the transducer 9. A second peak detector 51 is enabled by a reset signal from the microprocessor circuit 47 a predetermined time after the trigger signal is detected. The peak detector 2 shapes the received pulses and applies them to a second comparator 53. The microprocessor circuit 47 sets the reflection threshold of the comparator 53 to the variable threshold shown in FIG. 2, in a manner to be discussed. The microprocessor 47 determines the time between its receipt of the trigger signal as detected by the comparator 43 and the water reflection signal as output by the comparator 53 corrects this time for the selected temperature and produces a signal proportional to water level which is converted by the quad A/D converter 45 into either a zero to ten volt voltage signal or four to twenty milliamp current signal which is sent to a display unit 55 in the plant control room over a twisted shielded pair cable 57.

The ultrasonic level measurement system 59 of the invention has multiple operating modes including: a monitor mode, a signal search mode, and a normal operating mode. In the monitor mode, the operator may program system parameters through commands entered by an RS232 interface 61. These parameters are stored in an electrically erasable programmable read only memory (EEPROM) 63. Table 1 lists the parameters A-P available in the exemplary system and indicates sample values. Some of these parameters are self explanatory and others will be understood from the following discussion. Each of these parameters is programmable.

TABLE 1

| | | |
|---|---|---|
| A: | Pipe inside diameter (in mils) = | 29000 |
| B: | Pipe wall thickness (in mils) = | 02760 |
| C: | Calibration temperature (in degrees Fahrenheit) = | 110 |
| D: | Number of background data collection = periods before calculation | 010 |
| E: | Number of rounds in each background data = collection period | 020 |
| F: | Number of pulses monitored for each foreground = calculation | 100 |
| G: | Percent of pulses needed in correct bin for = Signal Search Mode | 020 |
| H: | Percent of pules needed to allow a = foreground calculation | 010 |
| I: | Number of consecutive insufficient foreground = ops for restart | 010 |
| J: | Number of consecutive differing fore and = background for restart | 002 |
| K: | Auto-threshold percent of margin for each bin = | 025 |
| L: | Auto-threshold offset margin ($\times$ 20 mVolts) = | 002 |
| M: | Disable restart based on fore & = background differences | NO |
| N: | Disable signal search mode marker = | NO |
| O: | Parameter measured (Water level or Temperature) = | Level |
| P: | Analog output format for level measurement = (Range of level) | Format 1 |

An important function of the monitor mode is setting of the variable reflection threshold. This water reflection threshold must be greater than the reverberation and electrical noise. The thresholds may be manually set through the parameter Q in Table 1 or by invoking an auto-adjust threshold routine.

Figure 3:
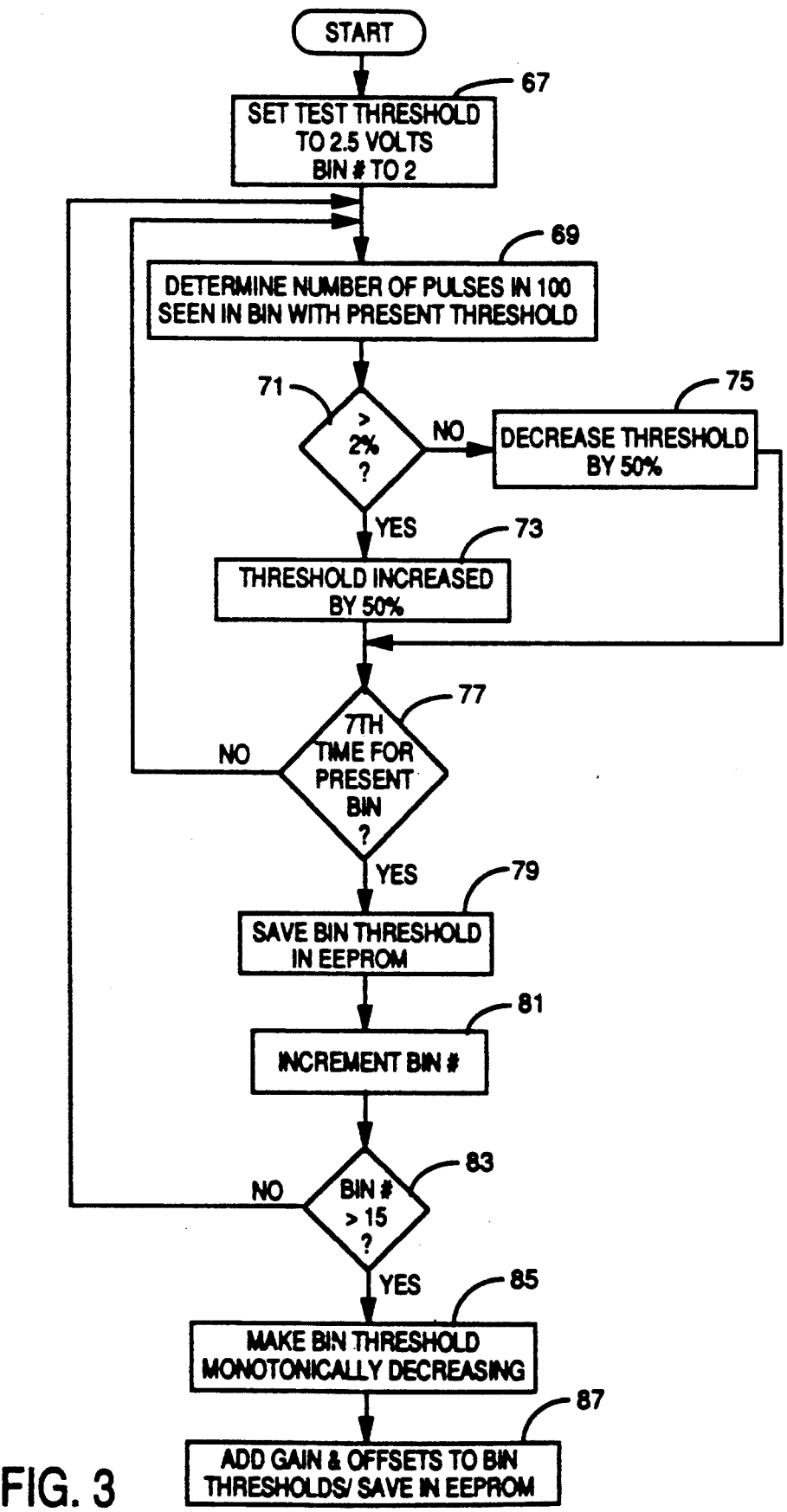
FIG. 3 is a flow chart for a program for automatically setting the variable thresholds.

A flow chart for a routine for automatically adjusting the variable threshold is shown in FIG. 3. This routine automatically sets the threshold level individually for each of the time bins from bin 2 up to the highest numbered bin. Upon being called at 65, the routine sets a test threshold to 2½ volts and sets a variable BIN# to bin 2 at 67. The number of pulses observed as exceeding this present threshold are then counted at 69. The microprocessor 47 controls the reset of the peak detector 53 so that only signals in the time bin for which the threshold is being set are counted. If more than 2% of the pulses result in detected reflections as determined at 71, the threshold is increased by 50% of the last voltage step at 73. On the other hand, if reflections are detected for less than 2% of the pulses, the threshold is decreased by 50% of the last voltage step at 75. This process is repeated for 7 iterations as determined at 77 in order to refine the threshold. The resultant threshold level is then stored in the EEPROM 63 at 79. The thresholds for the additional bins are then set in a similar manner by incrementing the bin number at 81 and determining when the threshold for all bins have been set at 83. The bin threshold is then made monotonically decreasing at 85. That is, the thresholds are set so that the thresholds for time bins successively later in time decrease or stay the same, but never increase over a threshold for an earlier time bin. Gains and offsets are applied to the thresholds with the results saved in the EEPROM 63 at 87.

The monitor mode is selected manually by the operator when any of the parameters are to be changed. This includes setting of the variable reflection threshold which may be done manually but which is preferably done automatically by the routine just discussed.

On startup of the system, the signal search mode is entered which locates the time bin of the reflection signal representing the water surface. The normal operation mode then entered. The normal operation mode performs foreground calculations and background calculations. The first foreground calculation looks in the bin identified in the signal search mode for the surface reflection signal. The background calculation performs a search like the search performed in the signal search mode to provide an extra level of assurance that the correct signal is being used to obtain the water level.

Figure 4:
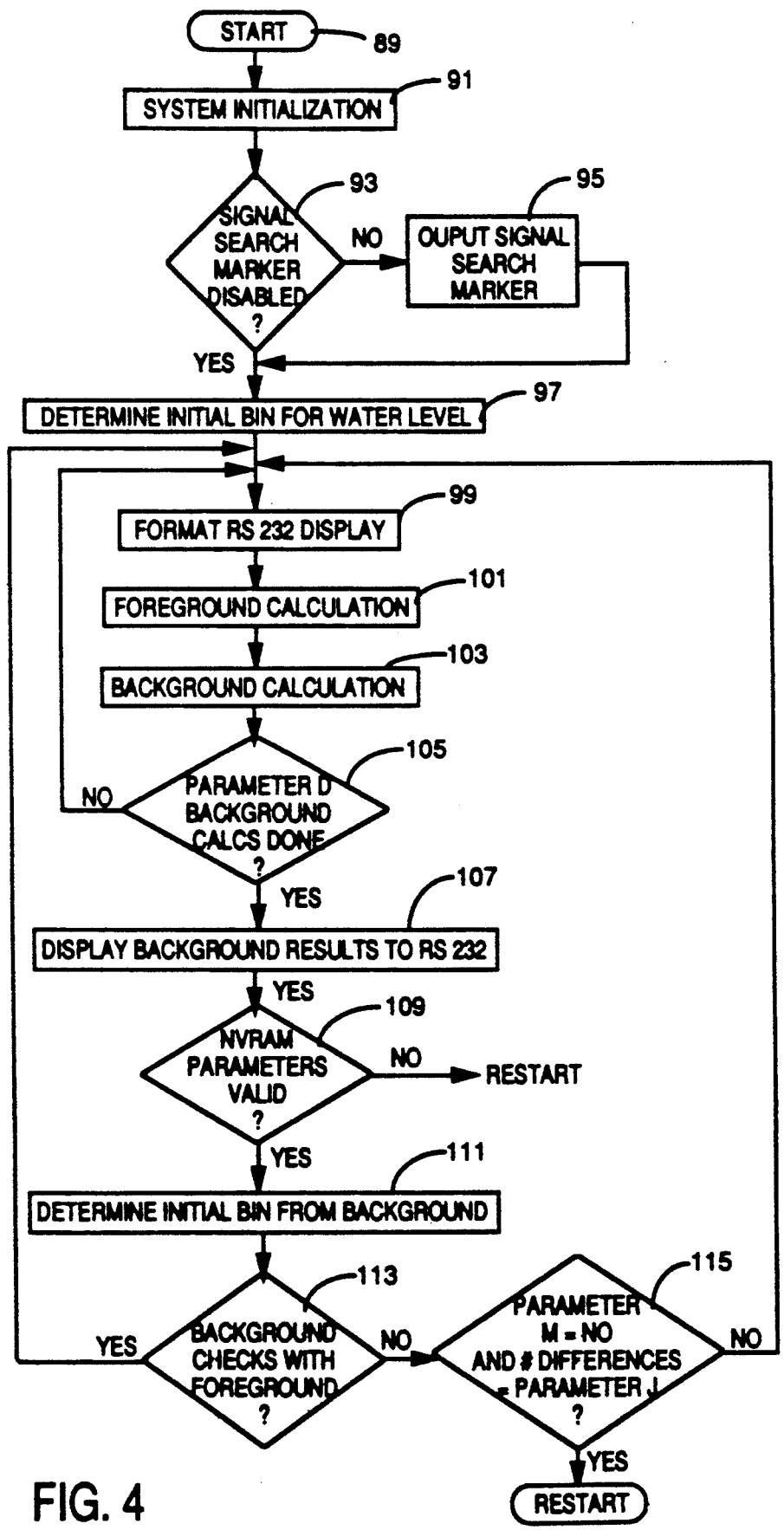
FIG. 4 is a flow chart for the main program for the ultrasonic level measurement system of the invention.

An overall flow chart for the signal search and normal operating modes is shown in FIG. 4. The signal search mode 88 is entered upon power-up at 89 or after abnormal conditions have resulted in the system calling for a restart. The signal search mode 88 initializes the system at 91. This initialization includes determining the threshold for the trigger signal. Initially, this threshold is set at a high level and reduced in 40 mVolts increments until the trigger signal is first detected. If a lower limit is reached without detecting the trigger, the system is not allowed to continue until the trigger has been detected. When the trigger signal is detected, the trigger threshold is set to be ⅔ of the level where it was first detected. This trigger threshold is used for the detection of the trigger signal in all subsequent operations. The trigger is the timing reference for all data collected for an individual ultrasonic pulse.

Initialization also includes determination of the wall reflection threshold. This wall reflection signal is used to provide a certain level of validity of the sensor 9 and the pulser/preamplifier 11. The wall reflection signal must be found in a window of between approximately 20 to 50 $\mu$Sec from the trigger signal. The wall reflection signal is also detected by setting an initial high value for the threshold and then decreasing this value for successive ultrasonic pulses until the wall reflection signal is detected or a lower limit is reached. The system is not allowed to continue in the signal search mode until the wall reflection signal is reached. This wall reflection threshold information is saved for use during the detection of the wall reflection signal and all further data acquisition operations. The wall reflection threshold is displayed on the terminal 55 after completion of the process.

Following initialization, if the signal search marker is not disabled as determined at 93 in FIG. 3, it is output at 95. The signal search marker consists of alternatively setting the analog output between full-scale and the minimum value for three cycles, staying on each level for approximately one second. After the third cycle, the analog output remains at the minimum value for the remainder of the signal search mode. This marker may be disabled through the parameter N.

Figure 5:
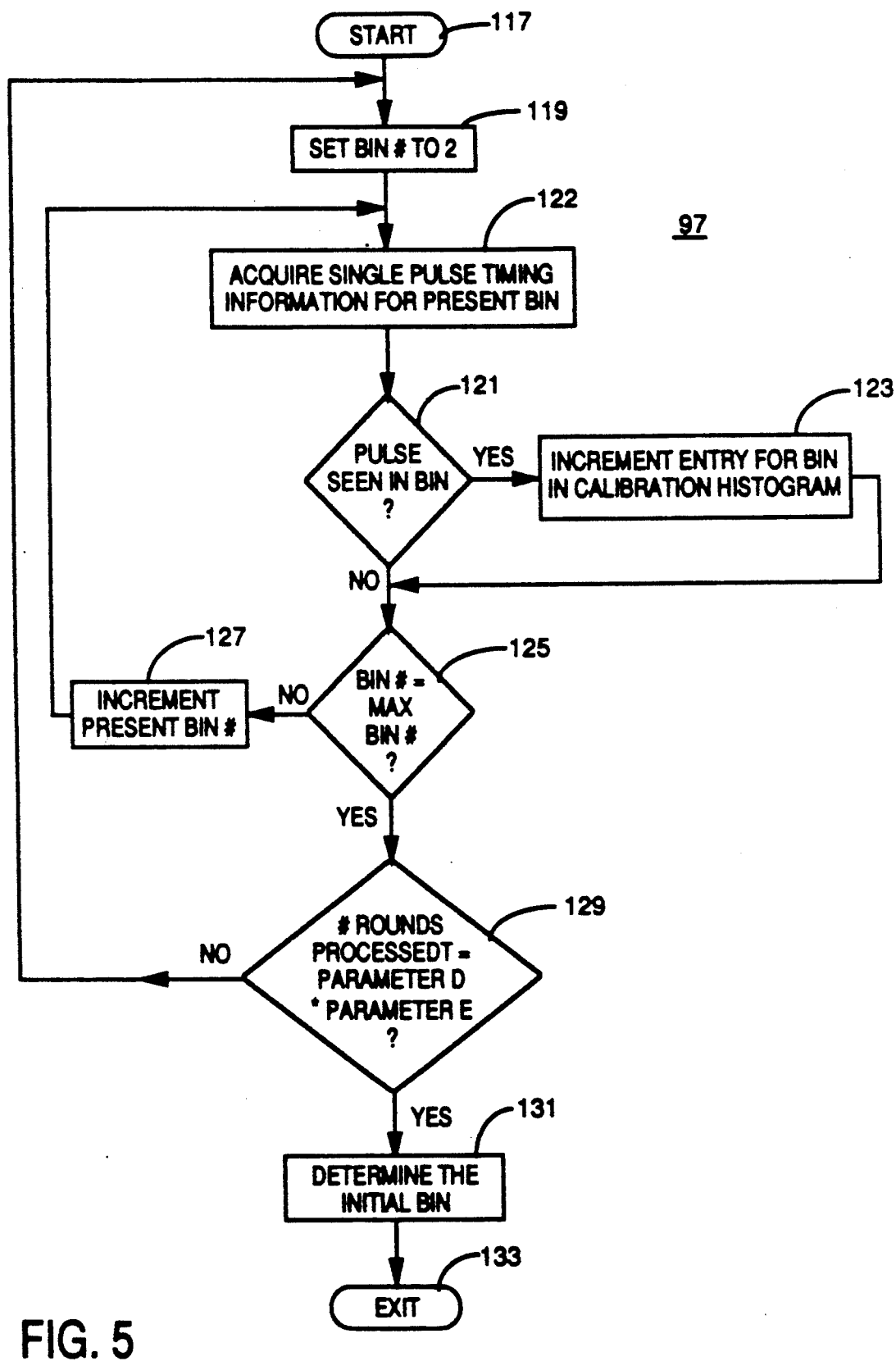
FIG. 5 is a flow chart of a program for determining the initial time bin for the water level.

The signal search mode then determines the initial bin for the water level at 97. The flow chart of a routine for accomplishes this is shown in FIG. 5 which is discussed below.

The system then enters the normal operation mode which is the most frequently used mode while the system is successfully sensing the water level within the pipe. This mode alternates between a foreground calculation and background calculation. Upon entering the normal operation mode, the RS232 display is formatted at 99. A loop is then entered which performs the foreground and background calculations. The foreground calculation is responsible for the termination of the precise water level and its output to the water level indication analog output as well as the status display on the RS 232 port. This is accomplished by acquiring the timing information from parameter F consecutive ultrasonic pulses and averaging the water reflection times which normally occur within a timing window centered around the last water level indication was observed. In the exemplary system, the timing window is plus or minus 125 $\mu$Sec. In order to remove the approximately 10 $\mu$Sec uncertainty in the individual data acquisition operations, any water level indication in the lower 20 $\mu$Sec of each 50 $\mu$Sec time bin will call for the data acquisition to begin in the previous bin. All water times in the timing window are averaged together to determine the water level. The analog output and the RS232 status message will then be updated to indicate the water level. The analog output will either correspondence to 0 inch to full pipe or 4 inch to full pipe, depending on the setting of parameter P.

As seen in FIG. 4, the foreground calculation is performed at 101 and is followed at 103 by the background calculation.

The background calculation part of the normal operation mode is needed to provide an extra level of assurance that the correct signal is being used to obtained the water level. It may be thought of as redoing of the signal search mode in the middle of normal operation for the purpose of restarting the system if a different signal is determined to be the proper water reflection signal. From the starting of the system with the water level below four inches. As the system will not detect such low water levels, the system may interpret a signal from a multiple reflection as the proper signal. The water level is then raised above four inches, the background calculation will detect the difference between the true level and the incorrectly determined level. The system will then be reset, allowing the correct level to be detected in the signal search mode.

The first background calculation begins with the clearing of the Calibration Histogram. Statistics are then collected in this array for parameter E rounds of ultrasonic pulses. A foreground calculation operation then takes place. This alternating operation sequence is repeated parameter D number of times. This results in the background calculation observing the same number of ultrasonic pulses as was done in the signal search mode.

As shown at 105, a number of these background calculations equal to the parameter D in Table 1 are performed. When this background data has been gathered, the background results are sent to the RS232 port at 107. The parameters stored in EEPROM are then checked at 109. If they are not valid, the system restarts by returning to the signal search mode.

If the stored parameters remain valid, a determination of the initial bin from the background calculations is performed at 111. This routine is shown in FIG. 5. If the initial bin determined from the background calculations agrees with the time bin being used by the foreground calculation as determined at 113, the program loops back and repeats the foreground and background calculation innerloop. If the initial bin determined by the background calculation differs from the bin used in the foreground calculation at 113, and the parameter M which can be selected to disable restart is equal to NO and the number of times that the initial bin selected by the background calculation differs from that used by the foreground calculation is equal to the parameter J at 115, the system restarts by returning to the signal search mode. Otherwise, the routine loops back and repeats the foreground and background calculations.

FIG. 5 illustrates a flow chart for determining the initial bin in the signal search mode which was identified at 97 in FIG. 4. This is accomplished by first acquiring the statistics from a number of rounds of trigger pulses. A round refers to the sequential collection of data from bin 2 to the maximum bin number. The number of rounds used in determining the initial bin is equal to the parameter D times the parameter E from Table 1. The statistics from these rounds are saved in an array referred to as the Calibration Histogram. Table 2 illustrates the Calibration Histogram for a 29 inch ID pipe for which 22 time bins are required. Individual bins are located in this histogram by adding the row number down the left side to the column number across the top. Thus, bin 21 is in the row labeled 20 and the column labeled 1 and records 200 reflected pulses. An element of the array is incremented when a signal is detected in the associated bin. The water level is then approximated through the selection of the bin represented by the lowest array element which has a value greater than or equal to a specified percentage of the number of rounds for which data was collected. Later entries in the array may be greater than this value, but may represent the detection of multiple reflections between the water surface and the pipe wall.

TABLE 2

| Bin Numbers | CALIBRATION HISTOGRAM | | | | | | | | | |
|---|---|---|---|---|---|---|---|---|---|---|
| | 0 | 1 | 2 | 3 | 4 | 5 | 6 | 7 | 8 | 9 |
| 0 | | | 0 | 0 | 0 | 0 | 0 | 0 | 0 | 0 |
| 10 | 0 | | 0 | 0 | 0 | 0 | 0 | 0 | 0 | 0 |
| 20 | 0 | 200 | | | | | | | | |

If a different sized pipe is selected, or operation at another temperature is selected, the number of bins monitored will change accordingly.

Figure 6:
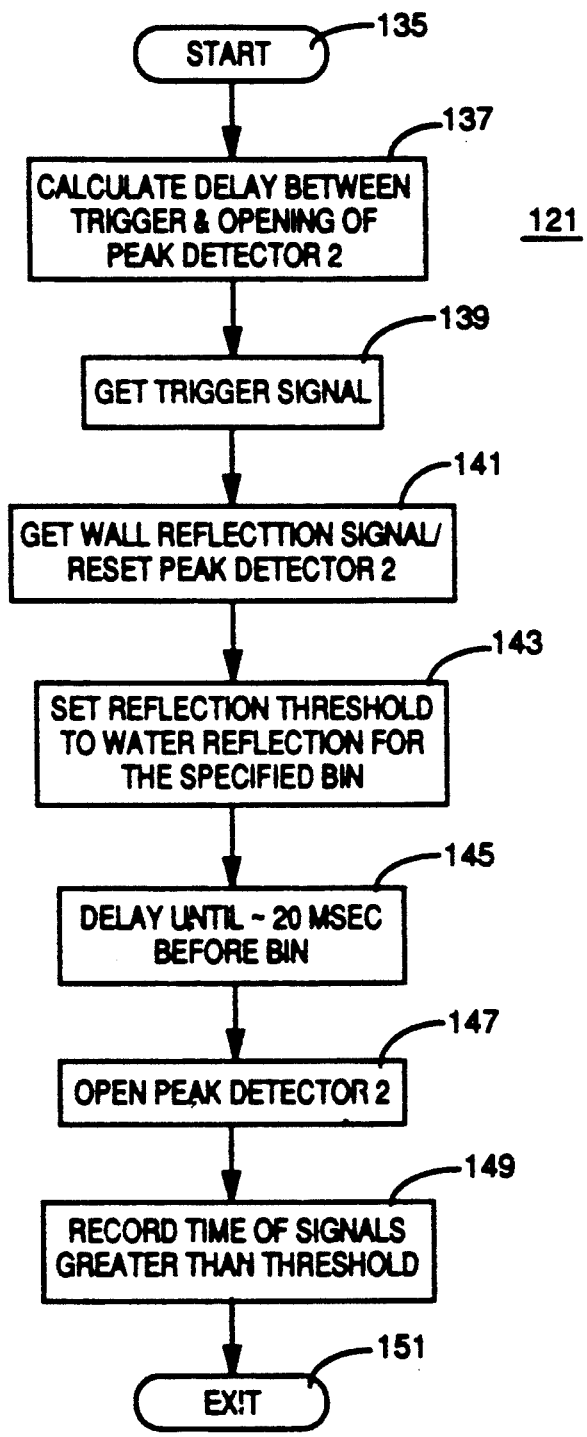
FIG. 6 is a flow chart for a program for gathering reflected pulse data.

Turning to FIG. 5, when the Determine Initial Bin routine is called at 117, a variable BIN# is set to 2 at 119 to begin a round. The timing information for that bin is then acquired at 121. The routine for this is shown in FIG. 6. If a pulse is seen in this bin as determined at 122, the entry for the bin in the Calibration Histogram is incremented at 123. In either event, if the round is not completed as determined at 125, BIN# is incremented at 127 and collection of the round continues. Successive rounds are completed until the total number of rounds completed equals the parameter D* parameter E as determined at 129. The initial bin is selected at 131 by selecting from the histogram the lowest time bin with counts greater than the parameter G % of parameter D* parameter E. The program then returns to the calling program at 133.

A flow chart for the routine 121 for acquiring single pulse timing information is illustrated in FIG. 6. When called at 135, the routine calculates the delay between the trigger pulse and opening of the second peak detector 51 (see FIG. 1) to look for the water reflection as indicated at 137. The trigger signal is then obtained from the first comparator 43 at 139. Following this, the wall reflection signal is obtained at 141 from the second comparator 53 and the second peak detector 51 is then reset to block the input of reflection pulses until the selected time bin. The threshold for this time bin is then set at 143. The system then delays at 145 until about 20 µs before the bin time and then opens the second peak 2 detector at 147 in order to record the time of signals having a magnitude greater than the threshold at 149. The system then returns to the calling routine at 151.

Figure 7:
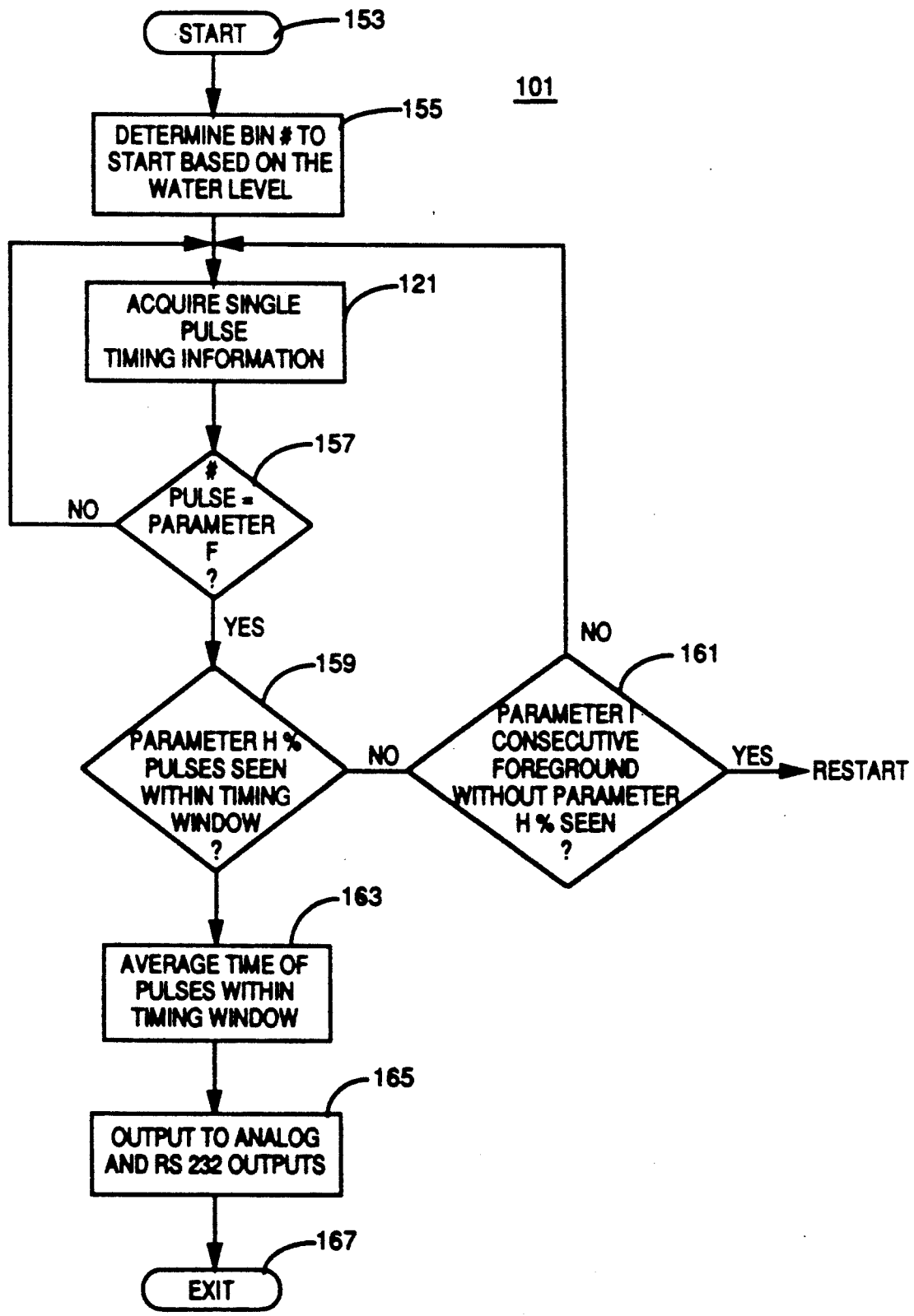
FIG. 7 is a flow chart for a program for performing the foreground calculations in the normal mode of the system.

FIG. 7 illustrates a flow chart for the foreground calculation 101 (in FIG. 4). When called at 153, the foreground calculation acquires the timing bin number for the water level determined by the last water level calculated. This time bin number is used to set the threshold and to open the second peak detector at the correct time. To Acquire Single Pulse Timing Information routine 121 is then used to gather the number of reflected pulses seen for a number of trigger pulses set by the parameter F as indicated at 157. If the number of pulses seen within the timing window is not parameter H % of the number of pulses (parameter F) as determined at 159, another set of data is gathered. If the parameter H % of the pulses is not seen for the parameter J consecutive number of times as determined at 161, the system is restarted by returning to the signal search mode. This would be an indication that the water level has been lowered below the time bin being examined.

When the selected percentage of pulses is seen as determined at 159, the average time for the pulses within the timing window is calculated at 163 and output to the analog and RS232 at 165 as the water level. The routine then exits at 167 to the background calculation 103 in FIG. 4.

Figure 8:
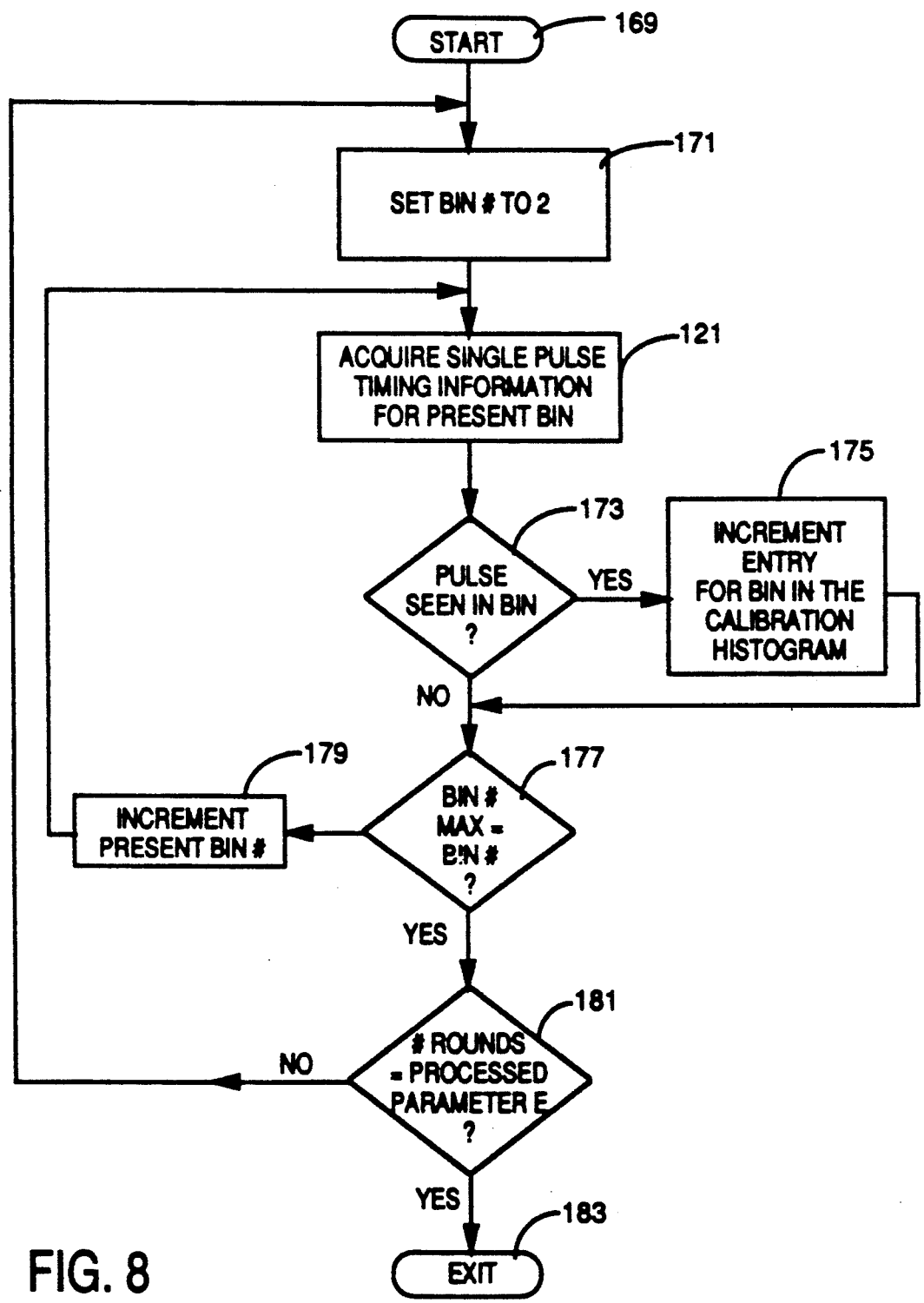
FIG. 8 is a flow chart of a program for performing the background calculation in the normal operating mode of the system.

A flow chart for the background calculation 103 (FIG. 4) is shown in FIG. 8. This routine which is called at 169 is similar to the Determine Initial Bin routine 97 (FIG. 5) used in the signal search mode. The parameter BIN# is initialized to 2 at 171, rounds of data are collected by utilizing the Acquire Single Pulse Timing Information routing 121 with the results recorded in a histogram as indicated at 173 and 175. Rounds of data are collected by cycling through the bins as indicated at 177 and 179. When the parameter E number of rounds have been collected as indicated at 181, the background calculation is exited at 183.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A system for measuring a liquid level in a liquid carrying container having a container wall, said system comprising:

a transducer acoustically coupled to said container wall;

pulse generating means for applying a transmit pulse to said transducer which causes said transducer to launch an acoustic pulse through said container wall into the liquid, the acoustic pulse generating reflected pulses from said container wall and liquid surface and causing reverberations which decay with time following said acoustic pulse to produce a reverberation profile;

threshold setting means for setting a variable threshold which is reduced in magnitude with time following said transmit pulse and which exceeds the reverberation profile in magnitude;

wherein said threshold setting means comprises means for setting said variable threshold having values approximating said reverberation profile with a selected margin; and means for comparing reflected pulses with said variable threshold at the time said reflected pulses are received and generating a liquid level signal when said magnitude of the reflected pulses exceeds said variable threshold.

2. The system of claim 1 wherein said threshold setting means comprises means dividing time following a transmit pulse into time bins and setting a threshold level for each time bin.

3. The system of claim 2 including means implementing a search mode in which a time bin for which reflected pulses exceed the threshold level for the time bin is identified, and an operating mode in which the threshold level for the identified time bin is compared to reflected pulses to generate said liquid level signal.

4. The system of claim 3 wherein said means implementing said search mode includes means generating for each time bin a count of reflected pulses which exceed the threshold level for said time bin, and selecting as said identified time bin, a time bin associated with a shortest time after said transmit pulse for which said count exceeds a selected value.

5. The system of claim 3 wherein said means implementing said operating mode includes means comparing said reflected pulses to the threshold level only for pulses received during an interval beginning with said identified time bin.

6. The system of claim 5 including means responsive to a pulse in an early portion of said identified time bin for extending said interval to include a next earlier time bin.

7. The system of claim 6 wherein said means comparing said reflected pulses to the threshold level compares said reflected pulses to a threshold level for said earlier time bin.

8. The system of claim 3 including means transferring from said operating mode to said search mode when a ratio of a number of pulses which exceed the threshold to the total number of transmit pulses falls below a certain value.

9. The system of claim 3 wherein said means implementing said operating mode includes means operating in foreground for generating said liquid level signal in response to reflected pulses received during a time window reference to a prior liquid level signal which exceed the threshold of said identified time bin, means operating in background searching said bins for reflected pulses which exceed threshold levels for said bins and reidentifying as a reidentified bin a lowest bin in which a selected ratio of reflected pulses to trigger pulses are received which exceed the threshold for said bin, and means identifying when a time represented by the liquid level signal and a time represented by said reidentified bin do not agree within a selected tolerance.

10. The system of claim 9 wherein said means implementing said operating mode transfers to said search mode when said reidentified bin is not the same as said identified bin.

11. The system of claim 3 wherein said means implementing said search mode comprises means generating a histogram of reflected pulses received within each bin, and means selecting said identified bin from said histogram.

12. The system of claim 2 wherein said means setting said thresholds for said time bins comprises means setting for each bin said threshold at an initial level, means counting a count of reflected pulses exceeding said threshold for a selected number of transmit pulses, means iteratively adjusting the level of said threshold to obtain a selected ratio of said count to said selected number of transmit pulses, and means setting said threshold to a level which substantially achieves said ratio.

13. The system of claim 12 wherein said adjusting means decreases the level of said threshold by a first selected factor when said ratio exceeds a selected value and decreases said level of said threshold by a second selected factor when said ratio does not exceed said selected value.

14. The system of claim of 13 including means programmably setting at least one of said selected number of transmit pulses and said first and second selected factors.

* * * * *